United States Patent
Melamed et al.

(10) Patent No.: US 8,213,502 B2
(45) Date of Patent: Jul. 3, 2012

(54) METHOD AND SYSTEM FOR REAL-TIME ADAPTIVE QUANTIZATION CONTROL

(75) Inventors: Eldad Melamed, Raanana (IL); Roni M. Sadeh, Kfar Saba (IL); Erez Barniv, Pardesiya (IL)

(73) Assignee: CEVA D.S.P. Ltd., Herzlia Pituach (IL)

( * ) Notice: Subject to any disclaimer, the term of this patent is extended or adjusted under 35 U.S.C. 154(b) by 1186 days.

(21) Appl. No.: 11/967,288

(22) Filed: Dec. 31, 2007

(65) Prior Publication Data
US 2009/0168869 A1 Jul. 2, 2009

(51) Int. Cl.
G06K 9/36 (2006.01)
(52) U.S. Cl. .................................... 375/240.03; 382/232
(58) Field of Classification Search ............. 375/240.03, 375/240.08, 240.12, 240.15, 240.18, 240.24, 375/240.26, 240.27; 382/162, 166, 232, 382/233, 239, 248, 250
See application file for complete search history.

(56) References Cited

U.S. PATENT DOCUMENTS

| | | | | |
|---|---|---|---|---|
| 5,073,821 A * | 12/1991 | Juri | ........................... | 375/240.03 |
| 5,355,167 A * | 10/1994 | Juri | ........................... | 375/240.03 |
| 5,479,211 A * | 12/1995 | Fukuda | .................... | 375/240.03 |
| 5,543,845 A * | 8/1996 | Asamura et al. | ......... | 375/240.02 |
| 6,104,753 A * | 8/2000 | Kim et al. | ................. | 375/240.16 |
| 6,463,100 B1 * | 10/2002 | Cho et al. | ................. | 375/240.03 |
| 6,658,157 B1 * | 12/2003 | Satoh et al. | ................ | 382/239 |
| 6,741,758 B2 * | 5/2004 | Hayashi et al. | ............... | 382/294 |
| 6,782,135 B1 * | 8/2004 | Viscito et al. | ................. | 382/239 |
| 7,606,124 B2 * | 10/2009 | Shibata et al. | ............... | 369/47.1 |
| 7,769,238 B2 * | 8/2010 | Abe et al. | ....................... | 382/233 |
| 2002/0002679 A1 * | 1/2002 | Murakami et al. | ............ | 713/176 |
| 2005/0271288 A1 * | 12/2005 | Suzuki et al. | ................. | 382/239 |
| 2006/0239361 A1 * | 10/2006 | Iguchi et al. | ............. | 375/240.29 |
| 2007/0058714 A1 * | 3/2007 | Noda | ........................ | 375/240.03 |
| 2007/0189626 A1 * | 8/2007 | Tanizawa et al. | ............. | 382/251 |
| 2008/0294446 A1 * | 11/2008 | Guo et al. | ...................... | 704/501 |

OTHER PUBLICATIONS

En-Hui et al. On Joint Optimization of Motion Compensation, Quantization and Baseline Entropy Coding in H.264 with Complete Decoder Compatibility. Mar. 18, 2005 2005 IEEE International Conference on Acoustics, Speech, and Signal Processing (IEEE Cat. No. 05CH37625) IEEE Piscataway, NJ, USA. pp. 325-328, XP010790642.

Sullivan et al. Rate-Distortion Optimization for Video Compression. Nov. 1, 1998 IEEE Signal Processing Magazine, IEEE Service Center, Piscataway, NJ, USA. pp. 74-90, XP011089821.

Wedi et al. Quantization Offsets for Video Coding May 23, 2005 Circuits and Systems, 2005. ISCAS 2005 IEEE International Symposium O N Kobe, Japan May 23-26, 2005 Piscataway, NJ, USA pp. 324-327, XP010815543.

European Search Report for Application No. 08172915.4. Dated May 26, 2009.

* cited by examiner

*Primary Examiner* — Chi Pham
*Assistant Examiner* — Prince A Mensah
(74) *Attorney, Agent, or Firm* — Pearl Cohen Zedek Latzer, LLP

(57) ABSTRACT

A system and method for controlling video compression quantization comprising generating a quantizer scale offset based on diagonal frequencies of luminance components of a data block samples, luminance intensity of the samples and motion activity of the data block, adjusting a first quantizer scale using the quantizer scale offset to receive a second quantizer scale and quantizing the data block using the second quantizer scale.

23 Claims, 3 Drawing Sheets

METHOD AND SYSTEM FOR REAL-TIME ADAPTIVE QUANTIZATION CONTROL

BACKGROUND

Digital video compression may be used in a variety of implementations, such as broadcasting, streaming and storage. Some video compression algorithms are considered to be loosy algorithms due to the fact that a certain amount of data may be lost during the compression process, for example, during the process of quantization. When using such algorithms the bit rate of the processed data may be reduced variably, depending on the entropy of the encoded block.

Quantization is usually a major cause of information loss during video compression process. Control of the quantization process in video encoding may significantly affect the quality of image. A real-time solution of an adaptive quantization control in order to enhance the subjective quality of the picture is highly required.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
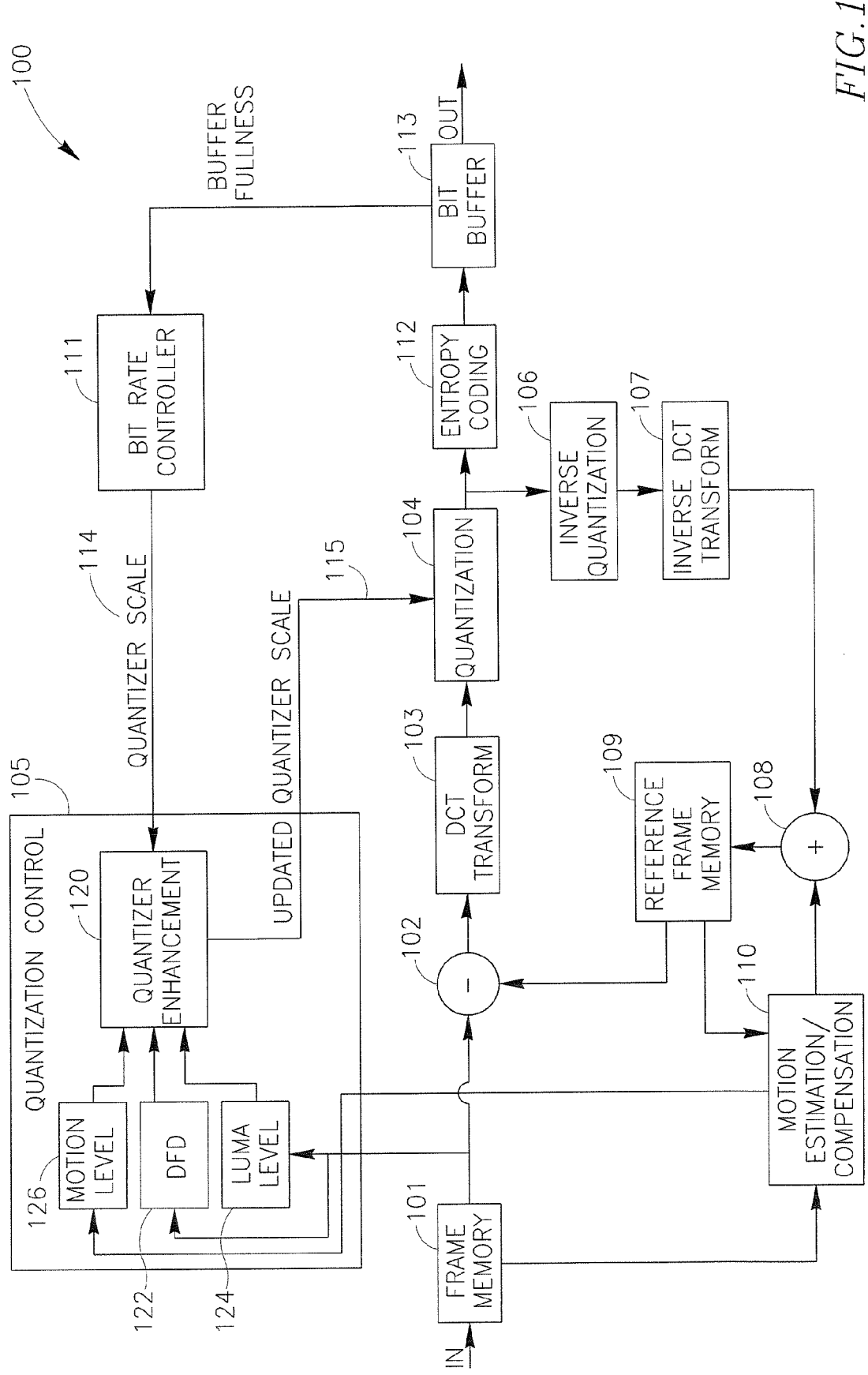
FIG. 1 is a block diagram of an exemplary video encoder according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Reference is now made to FIG. 1, which is a block diagram of an exemplary video encoder according to embodiments of the present invention. A video encoder 100 may include a frame memory 101 which may store an original image or frame to be encoded. The image or frame may be divided into macro blocks (MB), each MB may include a group of pixels, for example, by 16×16 pixels. A subtractor 102 may calculate the difference between the pixels of a current frame, stored in frame memory 101 and the pixels of a reference frame, stored in a reference frame memory 109. The difference may be transformed to the frequency domain by a Discrete Cosine Transform (DCT) 103 and the transformed output may be an array of coefficients representing the energy of the input data by horizontal, vertical and diagonal spatial frequencies. Video encoder 100 may include a quantizer 104 which may quantize the transformed output of DCT 103 and may be dynamically controlled by a quantization controller 105 as described in detail below according to embodiments of the present invention.

The quantized output signal may be inverse-quantized at an inverse quantizer 106 prior to undergoing an inverse DCT (IDCT) conversion at IDCT block 107. The output from IDCT 107 is added to the output of a motion estimation/compensation block 110 by an adder 108 and the calculated sum may be stored in reference frame memory 109. The data stored in reference frame memory 109 as well as the original image stored in frame memory 101 may both be used as inputs to subtractor 102 and to motion estimation/compensation block 110.

Although in the exemplary illustration of FIG. 1, DCT and IDCT are being used, it should be understood to a person skilled in art that the invention is not limited in this respect and according to embodiments of the present invention any other mathematical transform which may map a function from the time domain to the frequency domain may be used.

The output of quantizer 104 may also be a subject to entropy coding at entropy coding block 112 and the coded output signal from entropy coding block 112 may be output through bit buffer 113. Encoder 100 may include a bit rate controller 111 which may receive an input from bit buffer 113 indicating the fullness of bit buffer 113 and may transfer control signals and/or parameters to quantization controller 105.

According to embodiments of the present invention, quantization controller 105 may receive from bit rate controller 111 at least one parameter, also referred to herein as "quantizer scale" 114 which may be used for the quantization of the DCT transformed coefficients in quantizer 104. Quantization controller 105 may control the quantization of the DCT transformed coefficients in quantizer 104 by adapting or changing quantizer scale 114 received from bit rate controller 111 according to the complexity of the current MB and providing a new quantizer scale 115 to quantizer 104 as is described in detail below.

It is known that the human eye is less sensitive to quantization noise at "noisy" portions of the image, e.g., detailed surfaces, dark portions of a picture and fast moving objects. Accordingly, quantization controller 105 may control the quantization of such portions of a picture to be more coarse and may use saved bits for other portions, for example, where noise is very obvious e.g., smooth portions of image, faces. Quantization controller 105 may control the quantization of quantizer 104 to be coarse for high spatial activity and less coarse for lower spatial activity by changing the quantizer scale in order to enhance the subjective quality of the picture.

According to embodiments of the present invention, quantization controller 105 may provide a real-time adaptive quantization control to improve image quality. Quantization controller 105 may include a quantizer enhancement block 120, a diagonal frequency detector (DFD) 122, a luma level detector 124 and a motion level detector 126. The frequency detector (DFD) 122, the luma level detector 124 and the motion level detector 126 may all be coupled to the quantizer enhancement block 120. Quantizer enhancement block 120 may generate a new quantizer scale 115 based on inputs received from DFD 122, luminance (luma) level detector 124 and motion level detector 126.

According to embodiments of the present invention, DFD 122 may receive MB data of the current picture and may apply a diagonal frequency detection algorithm which may classify the smoothness level of the MB. The algorithm or function implemented by DFD 122 may include a low complexity calculation which may accurately detect high amplitudes at the diagonal transformed coefficients, which points block noisiness. The DFD algorithm may be applied on the luminance component (Y) samples of a current image, stored in frame memory 101, before performing the actual calculation of the DCT transform.

According to embodiments of the present invention, luma level detector 124 may receive MB data of the current picture and may calculate the luminance intensity of the input MB. Luma level detector 124 may further map the calculated value to predetermined levels using a conversion table.

According to embodiments of the present invention, Motion level detector 126 may receive one or more motion vectors from motion estimation/compensation block 110 and may detect the level of motion the current pictures by summing the received vectors components.

Quantizer enhancement 120 may use a weighted function of the diagonal frequency detection algorithm results, received from DFD 120, luminance level calculations received from luma level detector 124 and motion level information received from motion level detector 126 to produce quantizer offsets, and to use these offsets to determine a new quantizer scale 115.

Figure 2A:
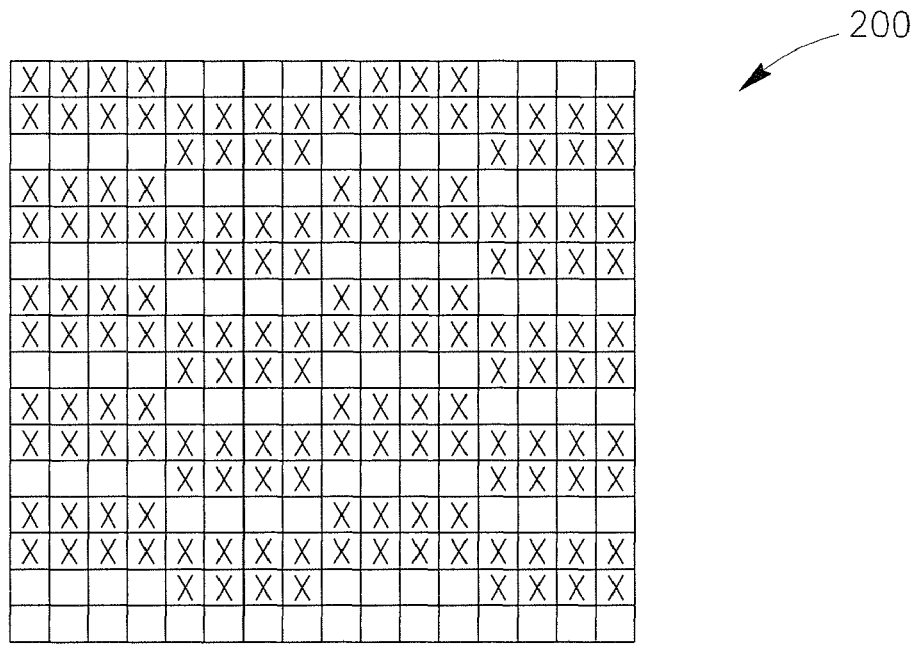
FIGS. 2A and 2B are sub sampling maps of an exemplary sub-sampled set of macro blocks used in accordance with embodiments of the present invention.
Figure 2B:
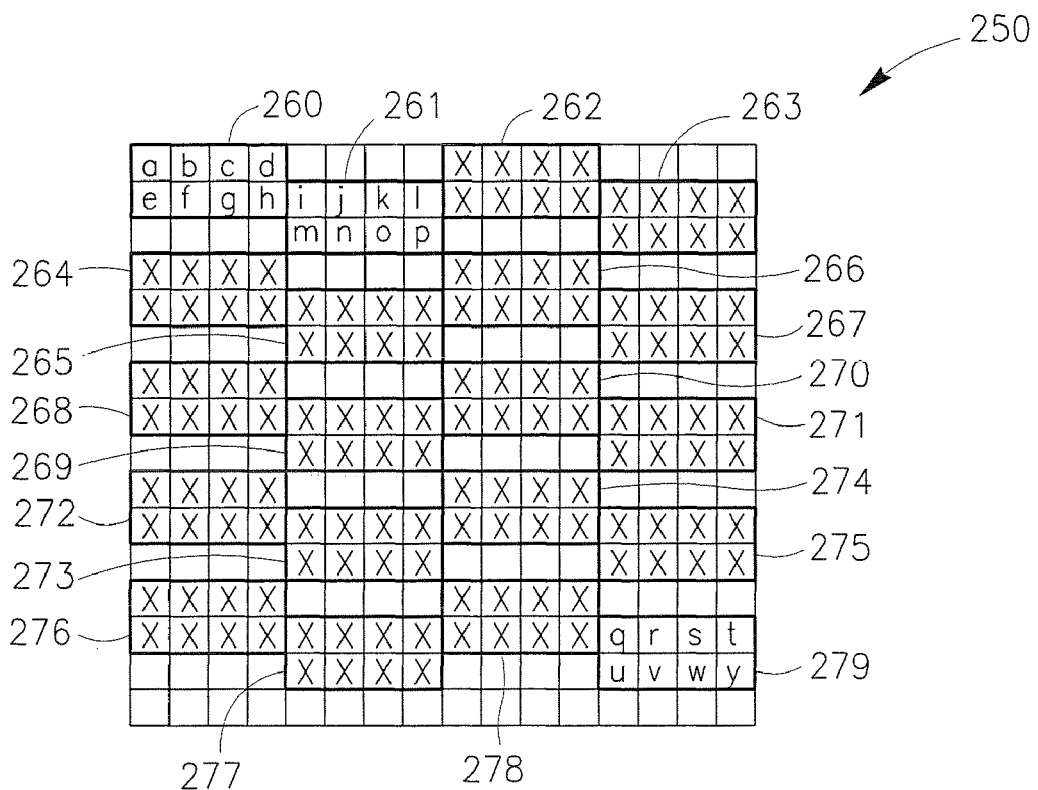

Although the present invention is not limited in this respect, the function detecting diagonal frequencies, implemented by DFD 120 and the function detecting luma intensity, implemented by luma level analyzer 124 may be applied on all the pixels of a MB or on a sub-sampled set of pixels of a MB. One example of a sub-sampled set of pixels of a MB is shown in FIGS. 2A and 2B. It should be understood to a person skilled in the art that the calculations and functions applied to the sub-sampled set of MB pixels may be applied to any other sub-sampled set of MB pixels or to the entire MB, namely, to all the pixels of a MB.

Reference is now made to FIGS. 2A and 2B, which are maps of an exemplary sub-sampled set of MB pixels used in accordance with embodiments of the present invention.

Map 200 illustrates an exemplary MB of 16×16 pixels, where each square of the map represent a single pixel. It should be understood to a person skilled in the art that any other size of MB may be used. Embodiments of the present invention may use all 256 pixels of map 200, or any sub set of pixels of map 200, the sub set of the pixels may be chosen according to the encoder implementation or speed, desired accuracy of the outputs of DFD 122 and luma level detector 124 or according to any other parameter. For example, encoders which perform parallel 4 bytes operation which are well optimized for, for example, DSP implementations may use the sub set of pixels of map 200 indicated by x's. Any other set of pixels may be used.

According to embodiments of the present invention, DFD 122 may subtract pairs of pixels to determine horizontal and vertical gradients as follows:

$$DFD = \Sigma |\{Y(i,j) - Y(i,j+1)\} - \{Y(i+1,j) - Y(i+1,j+1)\}| \quad [1]$$

for: i=0 to horizontal MB size
j=0 vertical MB size
and where Y represents the luminance component of the pixel.

The low complexity calculation of equation [1] may accurately detect high amplitudes at the diagonal transformed coefficients, which may points block noisiness, e.g., a high diagonal frequencies detection (DFD) result may imply that the MB may contain some high diagonal frequencies. The result of equation [1] may be transferred to the quantizer enhancement block 120 for determining the offset of the quantizer scale.

It should be understood to one skilled in the art that equation [1] may be applicable in embodiments which use all the pixels of a MB, and that equation [1] may be adapted to suit any other choice of sub set of pixels, for example as described in equations [2]-[10] that relate to DFD calculation of the sub set of pixels shown in map 250.

The pixels included in the DFD calculation of map 250 are pixels indicated by Latin letters (including x). Equation [1] may be adapted to subtract pairs of pixels of the marked pixels and may be defined as follows:

$$Y1 = Ya - Ye \quad [2]$$

$$Y2 = Yb - Yf \quad [3]$$

$$Y3 = Yc - Yg \quad [4]$$

$$Y4 = Yd - Yh \quad [5]$$

$$Z1 = abs(Y1 - Y2) + abs(Y2 - Y3) + abs(Y3 - Y4) \quad [6]$$

where: Ya to Yh represent the luminance component of the pixels marked with a to h.

Equations [2]-[4] may be used for every group of the 20 sub groups (260-279) of the MB each containing 8 pixels, for example, groups 260, 261, 262 and 279. After equations 2-4 are performed for each group of groups 260-279, the final DFD value may be calculated as follows:

$$DFD = \Sigma Zi \quad [7]$$

for: i=1 to 20.

Although in the exemplary illustration of map 250 of FIG. 2B, 20 groups, each containing 8 pixels are shown, it should be understood to a person skilled in art that the invention is not limited in this respect and according to embodiments of the present invention, any suitable groups of a MB containing any number of pixels may be used by DFD 122 for the DF calculations and equation [1] may be adapted to fit any selection of pixels of a frame.

According to embodiments of the present invention, luma level detector 124 may calculate the intensity of the luminance component of the chosen pixels of a MB as follows:

$$\text{Luma Level} = \Sigma Y(i,j) \quad [8]$$

for i=0 to horizontal MB size; and
j=0 to vertical MB size

The result of equation [8] may be transferred to the quantizer enhancement block 120 for determining the offset of the quantizer scale.

It should be understood to one skilled in the art that equation [8] may be applicable in embodiments which use all the pixels of a MB, and that equation [8] may be adapted to suit any other choice of sub-set of pixels, for example as described in equations [9]-[10] which relate to luminance level calculation of the sub-set of pixels shown in map 250.

The pixels included in the luminance level calculation of map 250 are the pixels marked with Latin letters (including x). Equation [8] may be adapted to calculate the intensity of the marked pixels by summing the luminance component of the marked pixels and may be described as follows:

$$L1=(a+b+c+d)+(e+f+g+h) \quad [9]$$

where L1 represent the luminance level of group 260.

Equation [9] may be used for every group of the 20 sub groups 260-279, each containing 8 pixels, for example, subgroup 261 illustrated by the pixels marked i to p. After equation [9] is performed for all 20 groups 260-279, the final luminance level value may be calculated as follows:

$$\text{LUMA\_LEVEL}=\Sigma Li \quad [10]$$

for: i=1 to 20.

Although in the exemplary illustration of map 250, groups 260-279, each containing 8 pixels are shown, it should be understood to a person skilled in art that the invention is not limited in this respect and according to embodiments of the present invention, any suitable groups of a MB containing any number of pixels may be used by luma level detector 124 for the luminance level calculations and equation [9]-[10] may be adapted to fit any selection of pixels of a frame.

According to embodiments of the present invention, motion level detector 126 may receive a plurality of motion vectors from motion estimation/compensation block 110. Each vector may be represented by an horizontal component (Vx) and a vertical component (Vy). Motion level detector may sum the absolute values of the motion vectors components of inter pictures as follows:

$$\text{Motion}=\Sigma|Vix|+\Sigma|Viy| \quad [11]$$

for i=0 to number of received vectors.

The result of equation [11] may be transferred to quantizer enhancement block 120 for determining the offset of the quantizer scale.

According to embodiments of the present invention, quantizer enhancement block 120 may receive the calculated DFD from DFD 122, the luminance level from luma level detector 124 and the absolute motion of a MB from motion level detector 126. In addition quantizer enhancement block 120 may receive the original quantizer scale, also referred to herein as "first" quantizer scale from bit rate controller 111. Quantizer enhancement block 120 may process one or more of the inputs and may use a weighting function of the calculated DFD, luminance level and absolute motion to determine an offset and to use this offset to generate a new quantizer scale, also referred to herein as "second" quantizer scale as described below.

Although the present invention is not limited in this respect, the calculated DFD received from DFD 122 may be further processed by quantizer enhancement block 120, for example, the DFD value may be converted to another value by performing any mathematical operation required. The mathematical operation or conversion may be performed by, for example, a shifter, an adder, a subtractor or by any other component or block which may convert the received DFD value. The mathematical operation may be determined based on parameters related to encoder's operation, such as the required output bit rate, parameters related to encoder implementation, such as for example, DSP, ASIC, FPGA or software implementation, parameters related to the video compression standard used by the encoder, such as MPEG-2, MPEG-4, H-264, or based on parameters related to any other encoder's characteristics.

Although in the description above the mathematical operation on the DFD value is described as performed by quantizer enhancement block 120, it should be understood to a person skilled in art that the invention is not limited in this respect and according to embodiments of the present invention, any such mathematical operation may be performed in DFD 122 prior to the operation of quantizer enhancement block 120. For example, a shifter to shift the DFD value may be implemented in either DFD 122, quantizer enhancement block 120 or both DFD 122 and quantizer enhancement block 120.

Although the present invention is not limited in this respect, the input received from luma level detector 124 may be further processed by quantizer enhancement block 120, for example, the luminance level value received which indicate the intensity of a MB may be mapped, converted or scaled using one or more conversion tables and/or any other mathematical operation, such as shift operation in order to fit into a desired weighting function. The conversion table and/or mathematical operation may be predefined and may be based on parameters related to encoder operation, such as the required output bit rate, parameters related to encoder implementation, such as for example, DSP, ASIC, FPGA or software implementation, parameters related to the video compression standard used by the encoder, such as MPEG-2, MPEG-4, H-264, or based on parameters related to any other encoder's characteristics.

Although in the description above the conversion table applied on the luma level values is described as a part quantizer enhancement block 120, it should be understood to a person skilled in art that the invention is not limited in this respect and according to embodiments of the present invention, any conversion table and/or other mathematical operation may be performed in luminance level detector 124 prior to the operation of quantizer enhancement block 120. For example, a predefined conversion table may be included in either luma level detector 124, quantizer enhancement block 120 or both luma level detector 124 and quantizer enhancement block 120.

Although the present invention is not limited in this respect, the received input from motion level detector 126 may be further processed by quantizer enhancement block 120, for example, the motion level value received may be mapped, converted or scaled using one or more conversion tables and/or any other mathematical operation, such as shift operation in order to fit into a desired weighting function. The conversion table and/or mathematical operation may be predefined and may be based on parameters related to encoder's operation, such as the required output bit rate, parameters related to encoder implementation, such as for example, DSP, ASIC, FPGA or software implementation, parameters related to the video compression standard used by the encoder, such as MPEG-2, MPEG-4, H-264, or based on parameters related to any other encoder's characteristics.

Although in the description above the conversion table applied on the motion level values is described as a part quantizer enhancement block 120, it should be understood to a person skilled in art that the invention is not limited in this respect and according to embodiments of the present invention, any conversion table and/or other mathematical operation may be performed in motion level detector 126 prior to the operation of quantizer enhancement 120. For example, a predefined conversion table may be included in either motion level detector 126, quantizer enhancement block 120 or both motion level detector 126 and quantizer enhancement block 120.

According to embodiments of the present invention, Quantizer enhancement block 120 may calculate a quantizer scale offset by a pre-defined weighted function as follows:

$$\text{Quantizer scale offset} = (DFD) \times W0 + (\text{Luma\_Level}) \times W1 + (\text{Motion}) \times W2 \qquad [12]$$

Equation [12] may describe a general form of a weighted sum of products. W0, W1 and W2 may represent weights determined by a plurality of parameters, such as for example, parameters related to encoder operation, such as the required output bit rate, parameters related to encoder implementation, such as for example, DSP, ASIC, FPGA or software implementation, parameters related to the video compression standard used by the encoder, such as MPEG-2, MPEG-4, H-264 or any other parameter. The above parameters and/or any other parameter or characteristic related to the encoder may referred to herein as "encoder characteristics". According to other embodiments of the invention, the weighted sum of products may be an adaptive weighted function which may be dynamically change based on parameters related to characteristics of a video stream to be encoded.

The general form of equation [12] may relate to the DFD, Luma_Level and Motion values as the required values after processing, other embodiments may use a different weighted sum, for example, such as equation 13 which may include some or all of the pre-processing or conversions of some or all of the three inputs weighted of general equation 12 for example:

$$\text{Quantizer scale offset} = (DFD >> a0) \times W0 + (\text{table1} [\text{Luma\_Level} >> a1]) \times W1 + (\text{table2} [\text{Motion} >> a2]) \times W2 \qquad [13]$$

where: a0, a1, a2 are constant variables determined by the encoder characteristics;

W0, W1, W2 are weights determined by encoder characteristics;

Table1 is a predefined table used for conversion of luminance level values;

Table2 is a predefined table used for conversion of motion level values.

">>" represents a right shift;

"table [y] represent the value at an entry "y" in a table.

According to embodiments of the present invention, the quantizer scale offset calculated by equation [12], equation [13] or any other weighted function of the DFD, luminance level and motion level inputs, may be applied to the original quantizer scale, received from bit rate controller 111. For example, it may be added, subtracted, shifted or multiplied to/from original quantizer scale to produce the new quantizer scale 115. The new or second quantizer scale may be transferred from quantization control block 105 to quantization block 104 in order to dynamically change the quantization process and to provide a real-time adaptive quantization control.

Experimental measurements of Peak To Signal Ratio (PSNR) of a H.264 encoder for video streams with frame resolution of 720×480 pixels showed improvement in PSNR when quantization control according to embodiments of the invention was applied as indicated in the following table:

TABLE [1]

| Video Stream number | Bitrate [Kbps] | PSNR With quantization enhancement [dB] | PSNR No quantization enhancement [dB] |
|---|---|---|---|
| 1 | 2000 | 25.66 | 25.66 |
| 2 | 2000 | 28.64 | 28.34 |
| 3 | 2000 | 30.25 | 29.8 |
| 4 | 2000 | 32.14 | 31.91 |
| 1 | 1500 | 24.71 | 24.71 |
| 3 | 1500 | 28.7 | 28.21 |
| 4 | 1500 | 30.9 | 30.73 |
| 3 | 1000 | 26.64 | 26.27 |
| 4 | 1000 | 29.25 | 29.18 |

The values of table [1] were measured while using the following parameters and conversion tables:

a0=6, a1=15360, a2=3

W0=0.6, W1=0.2, W2=0.2 table1[ ]={−2, −1, 1, 3} table2[ ]={0, 0, 1, 2, 4}

Figure 3:
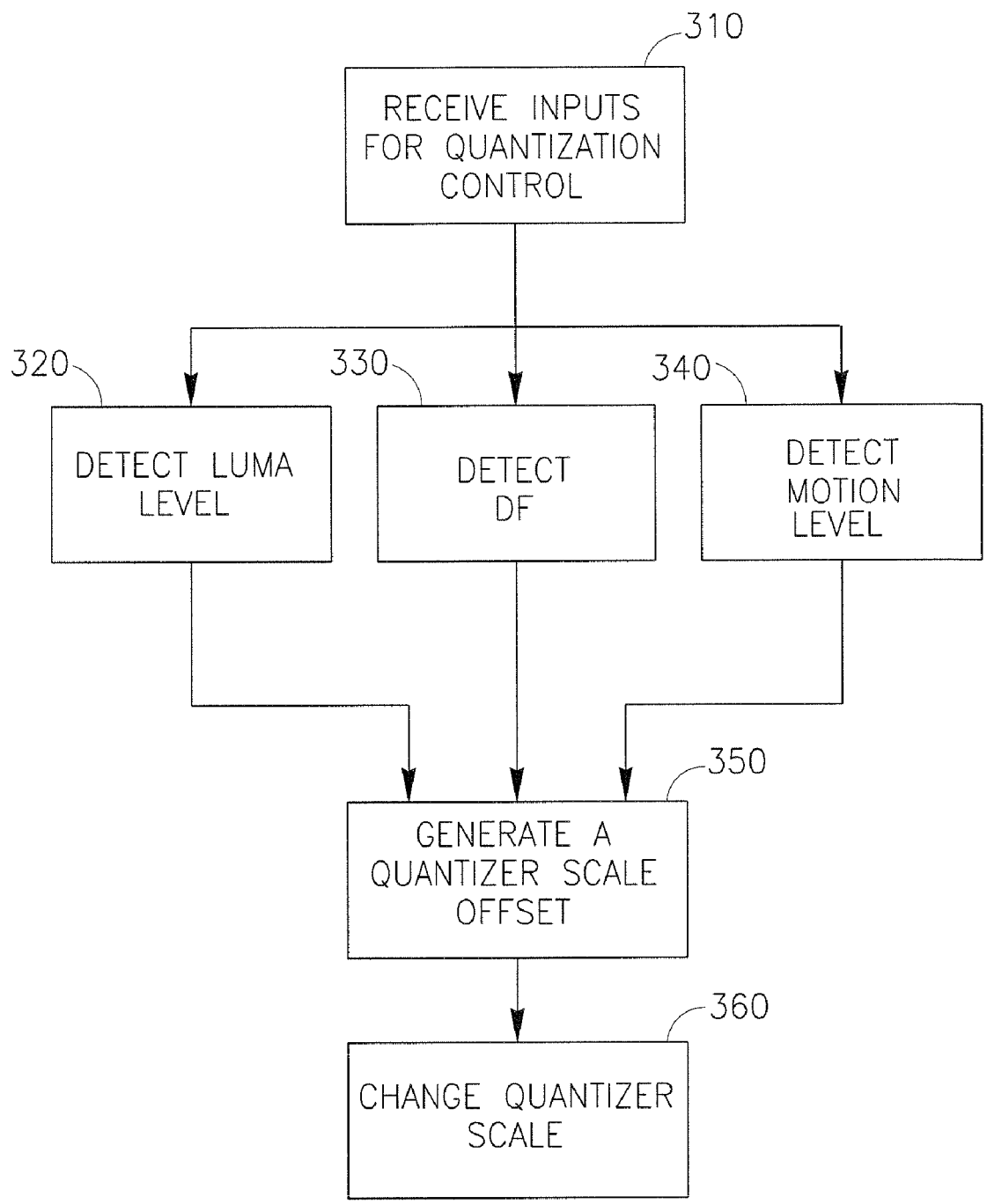
FIG. 3 is a flowchart of a method for performing adaptive quantization control according to embodiments of the present invention.

Reference is now made to FIG. 3, which is a flowchart of a method for performing adaptive quantization control according to embodiments of the present invention. Operations of the method may be implemented, for example, by encoder 100 of FIG. 1, and/or by other suitable units, devices, and/or systems.

As indicated at box 310, the method may include receiving inputs which may be used for controlling the quantization process. The inputs may include MB data of a current picture to be encoded, one or more motion vectors and a current used quantizer scale. All the inputs may be received by a quantization control block, for example, quantization control block 105 (of FIG. 1).

As indicated at box 320, the method may include detecting, obtaining or calculating the luminance level of the received MB data. Detecting the luminance level may include summing the intensities of the luminance components of a chosen set of pixels of the received MB data. Detecting the luminance level may be performed by a dedicated unit or block, for example, by luma level detector 124 (of FIG. 1). It should be understood, however to a person skilled in the art that any other mathematical operation may be performed in order to detect or calculate the luminance level and any other suitable unit or block may be used.

As indicated at box 330, the method may include detecting, obtaining or calculating the diagonal frequencies (DF) of the received MB data. Detecting the DF may accurately detect high amplitudes at the diagonal transformed coefficients of the received MB data, which may points block noisiness. Detecting the DF may include subtracting luminance components of pairs of pixels and summing the absolute values of the differences to determine horizontal and vertical gradients of the received MB data. Detecting the DF may be performed by a dedicated unit or block, for example, by DFD 122 (of FIG. 1). It should be understood, however to a person skilled in the art that any other mathematical operation may be performed in order to detect or calculate the DF and any other suitable unit or block may be used.

As indicated at box 340, the method may include detecting, obtaining or calculating the motion level between two or more frames. Detecting the motion level may include by summing the absolute values of vertical and horizontal components of the received motion vectors. Detecting the motion level may be performed by a dedicated unit or block, for example, by motion level detector 126 (of FIG. 1). It should be understood, however to a person skilled in the art that any other mathematical operation may be performed in order to detect or calculate the motion level and any other suitable unit or block may be used.

As indicated at box 350, the method may include generating a quantizer scale offset based on the values detected at boxes 320, 330 and 340. The generation, production or calculation of a quantizer scale offset may include summing products of weights determined by encoder characteristics multiplied by the values calculated at boxes 320, 330 and 340. The generation of the quantizer scale offset may be performed after further processing of the values calculated at boxes 320, 330 and 340. Generating the quantizer scale offset may be performed by a dedicated unit or block, for example, by quantizer enhancement block 120 (of FIG. 1). It should be understood, however to a person skilled in the art that any other mathematical operation may be performed in order to generate or calculate the quantizer scale offset and any other suitable unit or block may be used.

As indicated at box 360, the method may include changing a first quantizer scale to receive a second quantizer scale in order to enhance the quantization process of an encoder, for example, encoder 100 (of FIG. 1). Changing of the first quantizer scale which may be received as an input at box 310, may be performed by applying the quantizer scale offset generated at box 350 by for example, by adding, subtracting, shifting, multiplying to/from the first quantizer scale. Any other mathematical operation may be performed on the first quantizer scale and quantizer scale offset to receive the second quantizer scale. Changing the quantizer scale may be performed by a dedicated unit or block, for example, by quantizer enhancement block 120 (of FIG. 1). It should be understood, however to a person skilled in the art that any other mathematical operation may be performed in order to generate or calculate the second quantizer scale and any other suitable unit or block may be used.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for controlling video compression quantization comprising:
    generating a diagonal frequency factor based on differences between luminance components of pairs of adjacent pixels of at least a portion of a data block;
    generating a quantizer scale offset based on the diagonal frequency factor, luminance intensity of at least the portion of the data block and motion activity of the data block;
    adjusting a first quantizer scale using the quantizer scale offset to receive a second quantizer scale; and
    quantizing the data block using the second quantizer scale.

2. The method of claim 1, wherein generating the quantizer scale offset comprises applying a weighted function on the diagonal frequency factor, the luminance intensity and the motion activity.

3. The method of claim 1, wherein generating the diagonal frequency factor comprises:
    selecting groups of pixels within the data block;
    calculating a corresponding group luminance component for each of said groups; and
    adding the group luminance components to calculate the diagonal frequency factor,
    wherein, for each of said groups, calculating the group luminance component comprises:
    subtracting luminance components for pairs of horizontal adjacent pixels resulting in a first group of differences;
    subtracting pairs of first group of differences of vertically adjacent pairs of pixels resulting in a second group of differences; and
    summing the second group of differences to calculate the group luminance component.

4. The method of claim 2, wherein applying the weighted function comprises processing of at least one of the diagonal frequency factor, the luminance intensity of the samples and the motion activity of the data block, based on parameters related to characteristics of a video compression encoder.

5. The method of claim 3, wherein the groups of pixels within the data block include all pixels of the data block.

6. The method of claim 3, wherein the groups of pixels within the data block define a sub-set of the data block.

7. The method of claim 2, wherein the weighted function includes a pre-defined weighted sum of products based on parameters related to characteristics of a video compression encoder.

8. The method of claim 2, wherein the weighted function includes an adaptive weighted sum of products based on parameters related to characteristics of a video stream to be encoded.

9. The method of claim 1, wherein generating the diagonal frequency factor comprises:
    selecting groups of pixels within the data block;
    calculating a corresponding group luminance component for each of said groups; and
    adding the group luminance components to calculate the diagonal frequency factor,
    wherein, for each of said groups, calculating the group luminance component comprises:
    subtracting luminance components for pairs of vertical adjacent pixels resulting in a first group of differences;
    subtracting pairs of first group of differences of horizontally adjacent pairs of pixels resulting in a second group of differences; and
    summing the second group of differences to calculate the group luminance component.

10. The method of claim 1 comprising:
    updating the quantizer scale offset and the second quantizer scale for the data block in real-time prior to quantizing the data block.

11. A system for controlling video compression quantization comprising:
    a bit rate controller to generate a first quantizer scale;
    a quantization controller comprising a diagonal frequency detector to generate a diagonal frequency factor based on differences between luminance components of pairs of adjacent pixels of at least a portion of a data block, wherein the quantization controller is to generate a quantizer scale offset based on the diagonal frequency factor, luminance intensity of at least the portion of the data block and motion activity of the data block and to adjust a first quantizer scale using the quantizer scale offset to receive a second quantizer scale; and
    a quantizer to quantize the data block using the second quantizer scale.

12. The system of claim 11, wherein the quantization controller is to generate the quantizer scale offset by applying a weighted function on the diagonal frequency factor, the luminance intensity and the motion activity.

13. The system of claim 11, wherein
    the diagonal frequency detector selects groups of pixels within the data block; calculates a corresponding group luminance component for each of said groups; and adds the group luminance components to calculate the diagonal frequency factor, wherein, for each of said groups, the diagonal frequency detector subtracts luminance components for pairs of horizontal adjacent pixels to result in a first group of differences; subtracts pairs of first group of differences of vertically adjacent pairs of pixels to result in a second group of differences and sums the second group of differences to determine the group luminance component.

14. The system of claim 12, wherein applying the weighted function comprises processing of at least one of the diagonal frequency factor, the luminance intensity of the samples and the motion activity of the data block, based on parameters related to characteristics of a video compression encoder.

15. The system of claim 13, wherein the groups of pixels within the data block include all pixels of the data block.

16. The system of claim 13, wherein the groups of pixels within the data block define a sub-set of the data block.

17. The system of claim 12, wherein the weighted function includes a pre-defined weighted sum of products based on parameters related to characteristics of a video compression encoder.

18. The system of claim 12, wherein the weighted function includes an adaptive weighted sum of products based on parameters related to characteristics of a video stream to be encoded.

19. The system of claim 11, wherein the diagonal frequency detector selects groups of pixels within the data block; calculates a corresponding group luminance component for each of said groups; and adds the group luminance components to calculate the diagonal frequency factor, wherein, for each of said groups, the diagonal frequency detector subtracts luminance components for pairs of vertical adjacent pixels to result in a first group of differences; subtracts pairs of first group of differences of horizontally adjacent pairs of pixels to result in a second group of differences and sums the second group of differences to determine the group luminance component.

20. The system of claim 11, wherein the quantization controller is to update the quantizer scale offset and the second quantizer scale in real-time.

21. A non-transitory computer readable-medium, having stored thereon instructions, that when executed on a computing platform, result in:

generating a diagonal frequency factor based on differences between luminance components of pairs of adjacent pixels of at least a portion of a data block;

generating a quantizer scale offset based on the diagonal frequency factor, luminance intensity of at least the portion of the data block and motion activity of the data block;

adjusting a first quantizer scale using the quantizer scale offset to receive a second quantizer scale; and quantizing the data block using the second quantizer scale.

22. The non-transitory computer readable medium of claim 21, wherein the instructions resulting in generating the quantizer scale offset comprises applying a weighted function on the diagonal frequency factor, the luminance intensity and the motion activity.

23. The non-transitory computer readable medium of claim 21, wherein the instructions resulting in generating the quantizer scale offset comprises:

selecting groups of pixels within the data block;

calculating a corresponding group luminance component for each of said groups;

and adding the group luminance components to calculate the diagonal frequency factor, wherein, for each of said groups, calculating the group luminance component comprises:

subtracting luminance components for pairs of horizontal adjacent pixels resulting in a first group of differences;

subtracting pairs of first group of differences of vertically adjacent pairs of pixels resulting in a second group of differences;

and summing the second group of differences to calculate the group luminance component.

* * * * *